Aug. 21, 1923.

S. T. HENRY

SPEAR

Filed Oct. 9, 1922

1,465,267

Solomon T. Henry
INVENTOR
BY Victor J. Evans
ATTORNEY

WITNESS:

Patented Aug. 21, 1923.

1,465,267

UNITED STATES PATENT OFFICE.

SOLOMON T. HENRY, OF DOWNSVILLE, LOUISIANA.

SPEAR.

Application filed October 9, 1922. Serial No. 593,323.

*To all whom it may concern:*

Be it known that I, SOLOMON T. HENRY, a citizen of the United States, residing at Downsville, in the parish of Union and State of Louisiana, have invented new and useful Improvements in Spears, of which the following is a specification.

This invention relates to a spear for spearing fish and the like, the general object of the invention being to provide means for insuring the fish remaining attached to the spear after being caught.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
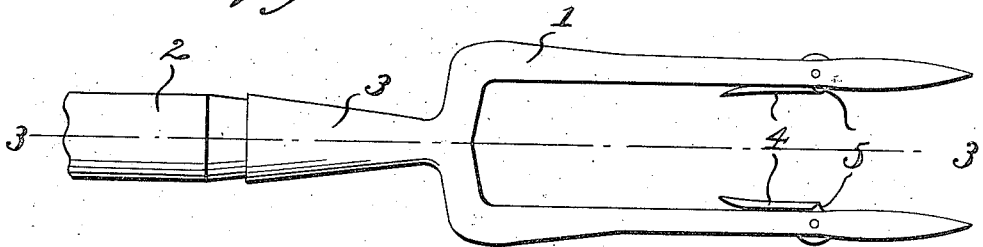
Figure 1 is a view of a spear showing the beards in closed position.
Figure 2:
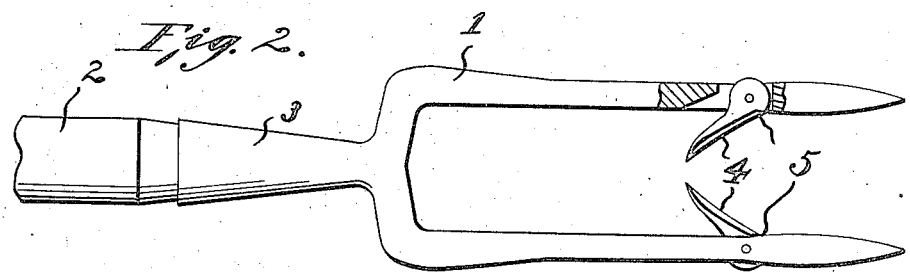
Figure 2 is a similar view with the beards in open position.
Figure 3:
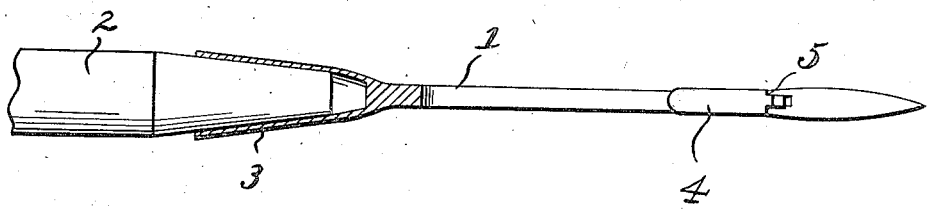
Figure 3 is a section on line 3—3 of Figure 1.

As shown in these views the spear 1 is of forked shape and the handle 2 is connected therewith by engaging the socket 3. The prongs have pivoted thereto the beards 4 which incline, when in open position, towards the closed end of the fork but under the weight or struggle of a fish to release itself from between the prongs the beards will open and thus approach each other and prevent the fish from falling off the spear. As shown the prongs have recesses therein in which the beards are pivoted, each recess having a straight outer wall and an inclined inner wall and each beard has flanges for engaging the inner walls of the prong when the central part of the beard is engaging the inclined wall and a shoulder 5 is formed on each beard for engaging the straight wall to limit the outward movement of the beard.

From the above it will be seen that when a fish has been caught between the prongs or on the prongs the beards will open out and thus prevent the fish from slipping off the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A spear of the class described comprising a forked member having a recess in each prong, each recess having its outer wall straight and its inner wall inclined, a beard pivotally mounted in each recess, each beard having flanges for engaging the inner walls of the prong when the central part of the beard is engaging the inclined wall, and a shoulder formed on each beard for engaging the straight wall for limiting the outward movement of the beard.

In testimony whereof I affix my signature.

SOLOMON T. HENRY.